Patented Aug. 16, 1932

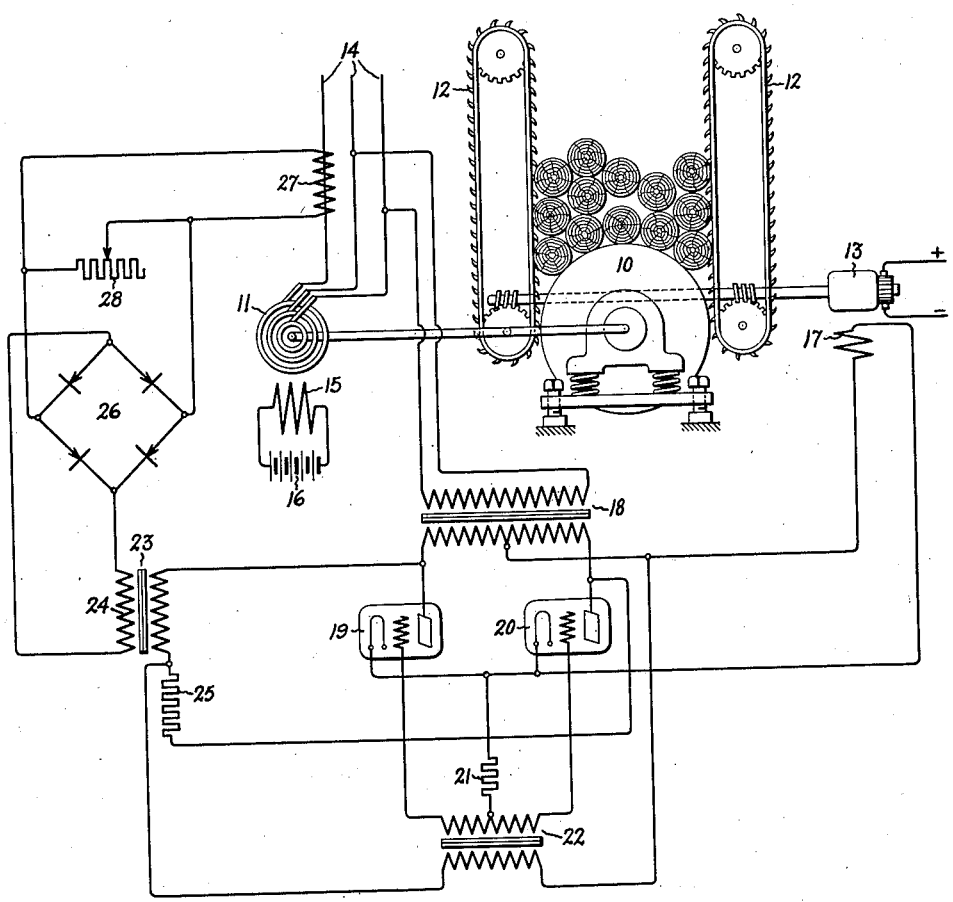

1,871,499

UNITED STATES PATENT OFFICE

HARRY R. CRAGO, OF SCHENECTADY, NEW YORK, ASSIGNOR TO GENERAL ELECTRIC COMPANY, A CORPORATION OF NEW YORK

ELECTRIC CONTROL SYSTEM

Application filed April 17, 1931. Serial No. 530,889.

My invention relates to electric control systems and more particularly to such systems in which a motor driven mechanism performs any of a number of operations upon a material which is continuously supplied to the mechanism by an auxiliary variable speed motor.

In the operation of a motor operated mechanism of the above mentioned type such as grinders, crushers, comminutors, etc., it is desirable that the material to be operated upon be supplied to the mechanism at such a rate that a constant load is maintained upon the motor driven mechanism. Heretofore there have been devised several arrangements which sought to accomplish this result. Many of the arrangements of the prior art have, however, involved the use of moving parts and contacts which are subject to wear and deterioration and by means of which it is not possible to secure the desired fineness of regulation.

It is an object of my invention, therefore, to provide an improved electric control system for motor driven machines adapted to operate on continuously fed material which will be simple and reliable in operation and by means of which any desired fineness of regulation may be secured.

It is another object of my invention to provide an improved electric control system for motor driven machines adapted to operate on continuously fed material in which the desired regulation is effected by means of electric valves.

In accordance with my invention, the field winding of the variable speed feed motor, which is adapted to feed materials to the operating mechanism, is energized through a controlled rectifier. The output of this rectifier is controlled by shifting the phase of the grid potentials of the rectifier valves with respect to the anode potentials. This phase shifting is accomplished by means of an impedance phase shifting circuit including a saturable reactor, the saturation of which is varied in accordance with the variation of the load current of the main driving machine.

For a better understanding of my invention, together with other and further objects thereof, reference is had to the following description taken in connection with the accompanying drawing and its scope will be pointed out in the appended claims. The single figure of the accompanying drawing illustrates my invention as applied to a pulp-grinding machine.

Referring more particularly to the drawing, I have illustrated a pulp-grinding mechanism comprising a main grinding mechanism 10 driven by means of a direct connected synchronous motor 11 and a feeding mechanism 12 driven by means of an auxiliary variable speed direct current motor 13. The synchronous motor 11 is connected to the alternating current circuit 14 and is provided with a field winding 15 energized from any suitable source of direct current, shown for the sake of simplicity as a battery 16. The variable speed motor 13 is provided with a field winding 17 which is connected to be energized from the alternating current circuit 14 through a controlled rectifier comprising transformer 18 and electric valves 19 and 20 connected for full wave rectification as will be well understood by those skilled in the art. Electric valves 19 and 20 are each provided with an anode, a cathode and a control grid and may be of any of the several types well known in the art although I prefer to use valves of the vapor electric discharge type. The grids of these valves are connected to the common cathode circuit through a current limiting resistor 21 and opposite halves of the secondary winding of the grid transformer 22. In order to control the output of the rectifier in accordance with the load on the motor 11 and thus control the excitation of the feed motor 13, I provide an impedance phase shifting circuit comprising a saturable reactor 23, provided with a saturating winding 24, and a resistor 25 connected in series across the secondary winding of transformer 18. The saturating winding 24 is energized through a rectifier bridge 26, or other suitable rectifying means, from the secondary winding of the current transformer 27, which is included in the alternating current circuit 14. If desired, a variable resistor 28 may be connected across the secondary winding of this transformer in order to secure various regulating characteristics in accordance with the type of material to be operated upon. The primary winding of grid transformer 22 is connected between the midpoint of the secondary winding of transformer 18 and the junction between reactor 23 and resistor 25. However, this particular phase shifting circuit forms no part of my present invention but is disclosed and broadly claimed in a copending application of Myron Zucker, filed April 17, 1931, Serial No. 530,878, and assigned to the same assignee as the present application.

In explaining the operation of the above described apparatus, it will be assumed that it is initially in equilibrium, that is, the phase of the grid potentials of electric valves 19 and 20 with respect to the anode potentials of these valves is such that the average current delivered by the rectifier arrangement is just sufficient to maintain constant the desired speed of the motor 13 to maintain a constant load upon the main driving motor 11. In case the motor 11 tends to become overloaded, due to a change of the type of materials upon which the grinding mechanism is operating or for any other cause, the output of the current transformer 27 will increase and correspondingly increase the saturation of reactor 23. It will be well understood by those skilled in the art that, as the saturation of reactor 23 increases and its reactance decreases, the phase of the potential between the midpoints of the phase shifting circuit, which is applied to the primary winding of grid transformer 22, will advance with respect to the potential of the secondary winding of the transformer 18, that is, with respect to the anode potentials of electric valves 19 and 20, so that the average output of the rectifier arrangement is increased. An increase in the output of the rectifier arrangement increases the excitation of the field winding 17 of the variable speed motor 13 with the result that the speed of this motor is decreased. It will be apparent that a decrease in the speed of the feed motor 13 will decrease the rate at which material is fed to the grinding mechanism 10 with the result that the load on the motor 11 will be correspondingly decreased. Obviously if the load on the motor tends to decrease, the reverse operation will take place and a substantially constant load will be maintained on the driving motor 11.

Although I have described my invention as applied to an arrangement for maintaining a constant load on a motor driven pulp grinding machine, it will be apparent to those skilled in the art that it is equally applicable to crushers, grinders, comminutors, and any type of motor driven mechanism in which material is continuously fed to it.

While I have described what I at present consider the preferred embodiment of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States, is:

1. In combination, a mechanism for performing a predetermined operation upon a material, an electric motor for driving said mechanism, mechanism for continuously feeding said material to said work performing mechanism, a motor comprising field and armature windings for operating said feed mechanism, a source of alternating current, electric valve means interconnecting one of said windings and said source, and means responsive to the current drawn by said drive motor for controlling the conductivity of said valve.

2. In combination, a mechanism for performing a predetermined operation upon a material, an electric motor for driving said mechanism, mechanism for continuously feeding said material to said work performing mechanism, a motor for operating said feed mechanism, a field winding for said feed motor, rectifying means for energizing said field winding including an electric valve provided with an anode, a cathode, and a control grid, and means responsive to the load on said drive motor for shifting the phase of the potentials of said grid and anode.

3. In combination, a mechanism for performing a predetermined operation upon a material, an electric motor for driving said mechanism, mechanism for continuously feeding said material to said work performing mechanism, a motor for operating said feed mechanism, rectifying means for controlling said feed motor including an electric valve provided with an anode, a cathode and a control grid, an impedance phase shifting circuit including a saturable reactor, a grid circuit for said valve energized from said phase shifting circuit, a current transformer in circuit with said driving motor, and rectifying means for saturating said reactor from the output of said current transformer.

In witness whereof I have hereunto set my hand.

HARRY R. CRAGO.